Feb. 11, 1958     A. A. MORICI     2,822,843
TOMATO CORING MACHINE
Filed Oct. 9, 1956     3 Sheets-Sheet 1
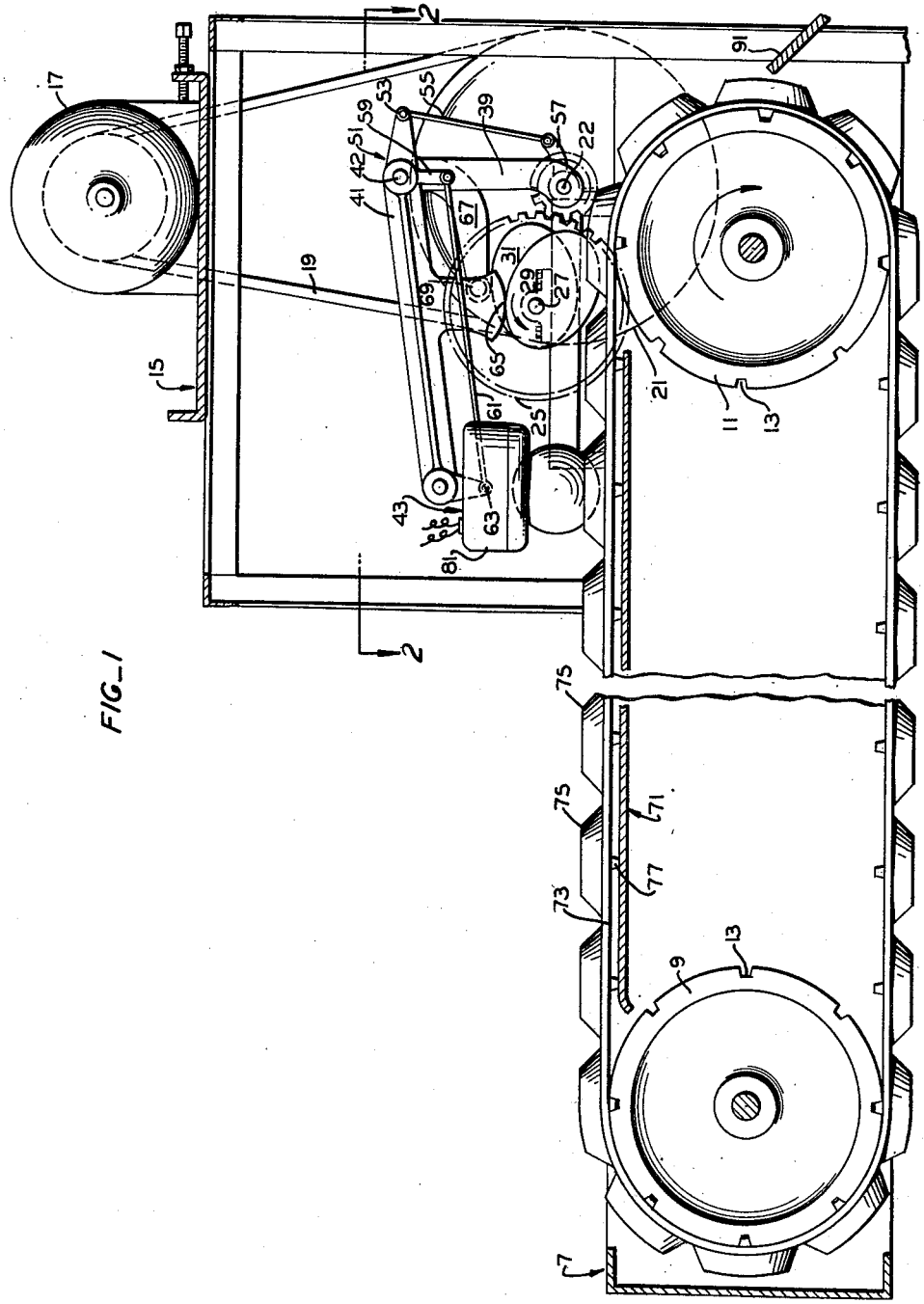
FIG_1
INVENTOR.
ALFRED A. MORICI
ECKHOFF & SLICK
ATTORNEYS
BY
A MEMBER OF THE FIRM

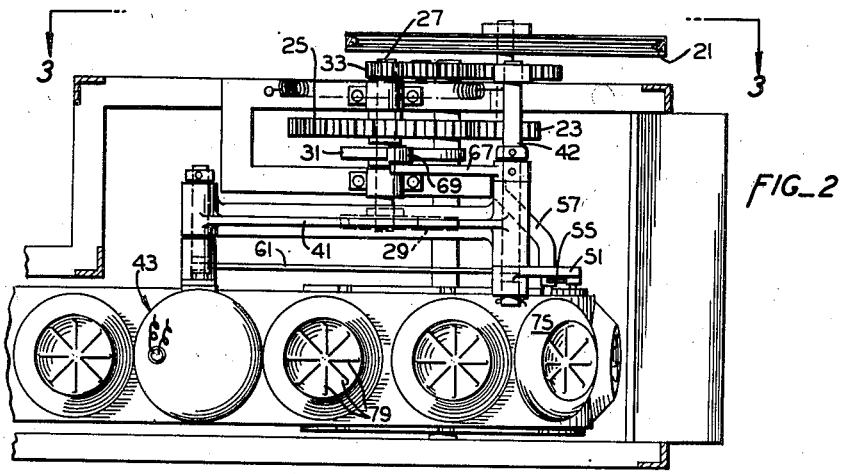
FIG_2
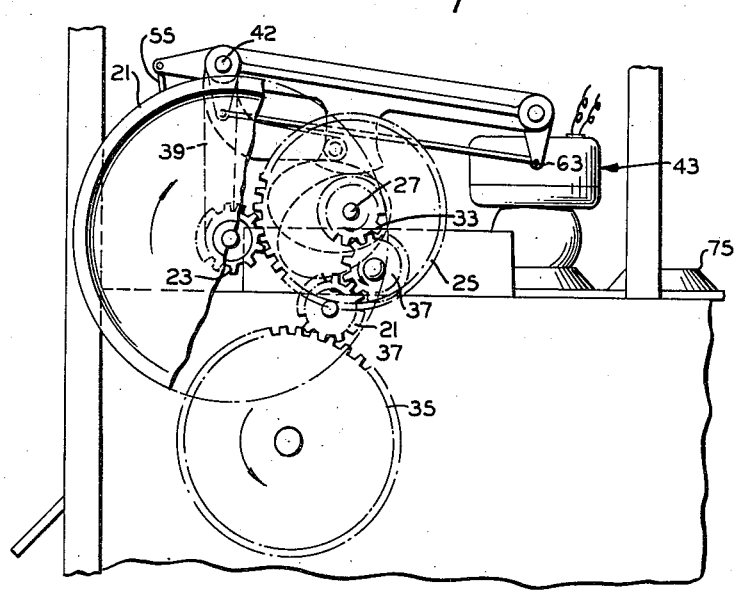
FIG_3
INVENTOR.
ALFRED A. MORICI
ECKHOFF & SLICK
ATTORNEYS
BY
A MEMBER OF THE FIRM

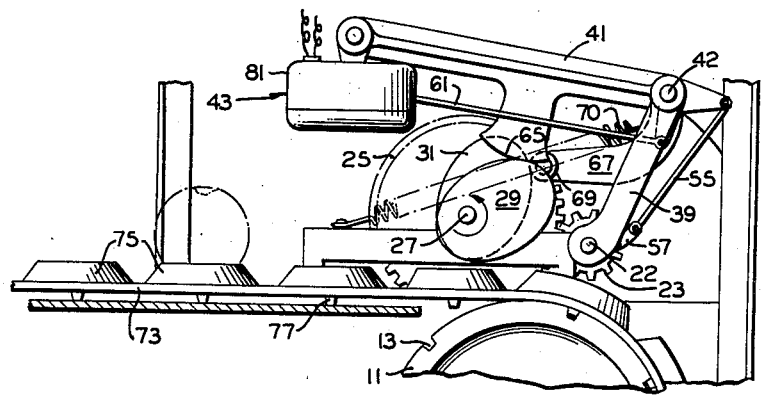
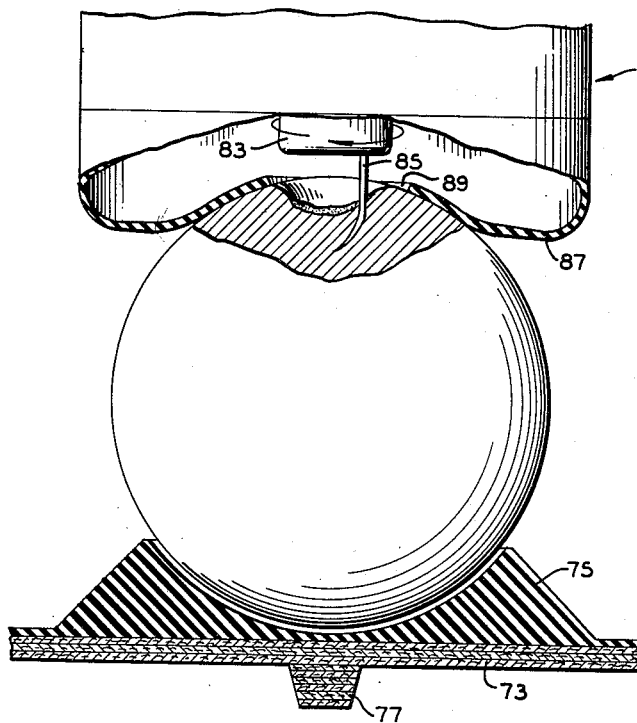

United States Patent Office 2,822,843
Patented Feb. 11, 1958

2,822,843

TOMATO CORING MACHINE

Alfred A. Morici, San Jose, Calif., assignor to Hershel California Fruit Products Co., Inc., a corporation of California Application October 9, 1956, Serial No. 614,989

1 Claim. (Cl. 146—52)

This invention relates to a device for automatically coring fruit such as tomatoes. Tomatoes are ordinarily cored by means of a device having a small, sharp, rotating knife therein wherein the top of the fruit is grasped by a soft rubber cup and the knife protrudes therefrom, and cuts out the core. Heretofore, it has been necessary to feed the tomatoes to such a device one at a time, and to hold them in place. This constitutes a considerable hazard to the operator since the coring knife is operating at a very high rate of speed such as 4500 R. P. M.

It is an object of the present invention to provide a machine for coring tomatoes wherein the tomatoes are conveyed to the machine on a belt and held firmly in place thereon and are cored and are discharged from the belt without the need of intervention of an operator except for the initial loading of the belt.

Another object of this invention is to provide a device for coring tomatoes which is largely automatic in its operation, which has a high through-put, and which does an effective coring job.

In the drawings forming a part of this application:

Figure 1 is an elevation view partly in section of a machine embodying the present invention.

Figure 2 is a plan view of a portion of the machine on the lines 2—2 of Figure 1.

Figure 3 is a partial elevational view of the machine of the present invention on the lines 3—3 of Figure 2.

Figure 4 is a fragmentary elevation view of the device, similar to a portion of Figure 1, showing the relationship of the parts when the cutting head is in a partially raised position.

Figure 5 is an enlarged fragmentary view of the cutting head and holding cup of the present invention, showing in detail the manner in which a tomato is cored.

Referring now to the machine by reference characters, the machine has a base, generally designated 7, to which are journaled for rotation two rollers 9 and 11, each of which has a series of slots therein, 13. The machine also includes an upper frame 15, to which is attached an electric motor 17, or other prime mover. The motor 17, through belt 19, drives the main drive wheel 21 mounted on shaft 22. The drive wheel 21 in turn has a pinion gear 23 mounted for rotation on the shaft 22 which in turn meshes with gear 25. The gear 25 is journaled on shaft 27, which is suitably mounted for rotation on the frame, which shaft carries a first cam 29, a second cam 31, and pinion 33. Pinion 33 serves to drive the driven roller 11 by means of the gear 35, which is mounted on the same shaft as the roller 11 through the two idler pinions 37. Mounted on shaft 22, but free to rotate independently thereof, is the arm 39, which has pivoted at the end thereof a second arm 41 on shaft 42. The arm 41 has pivoted at the opposite end thereof the cutter head assembly, generally designated 43, and which is described in greater detail hereinafter. Also pivoted on the shaft 42 is an L-shaped arm 51 which has ends 53 and 59 at right angles to each other. At end 53 is attached the arm 55, the opposite end of which is attached to member 57, which in turn is rigidly attached to the frame of the machine. The end 59 of arm 51 is attached to the arm 61, which is pivoted to the cutter head assembly at 63. The action of the arms thus far described is such that the cutter head assembly 53 may be raised or lowered or moved from one side to the other and yet will maintain a parallel relationship with the frame of the machine.

The arm 41 has as an integral part thereof a rounded cam follower face 65, which is adapted to engage the cam 29. The arm 39, mounted on the shaft 42, has a depending arm 67, which terminates in a cam following roller 69, adapted to follow cam 31. Spring 70 biases the shaft 42 to the left, as viewed in Figure 4.

Attached to the frame 7 is the member 71. An endless belt 73 is trained between the two rollers 9 and 11, the endless belt 73 being preferably made of rubber or some yieldable plastic. The belt 73 has a plurality of spaced fruit receiving cups 75 thereon and opposite each fruit receiving cup is a lug 77. The lugs 77 are adapted to fit in the notches 13 to maintain synchronism within the machine. The lugs 77 ride along the member 71, as is shown, and thus the series of fruit receiving cups 75 move in a plane as they pass through the machine. Each of the fruit receiving cups 75 has a series of ridges 79 therein, which serve to help position the fruit and to prevent it from turning when it is once placed in the proper position.

The cutting head 43 contains a motor element 81 having a shaft 83 thereon, to which is attached a short, sharp, coring knife 85. A guard assembly of a soft material such as rubber 87 is provided around the knife and the knife fits through a central opening 89 of the yieldable member 87. Although the motor element 81 has been represented in the drawing as being an electric motor, in many instances, it will be preferable to employ a small water-driven turbine which not only drives the rotating knife 85, but also provides a flow of water through the device which will automatically keep the device clean and wash away the cores as they are cut out.

In operation, an operator places a fruit in each of the fruit receiving cups 75 with the calax end of the fruit upward. The belt 73 moves continuously and as it enters the machine, in the position shown in Figure 1, the cam 29, which is rotating counter-clockwise in Figure 1, lowers the arm 41, which in turn causes the cutter assembly 53 to come into contact with the fruit and cut out the core. As the belt continues to move, the cam 31 causes the arm 39 to move to the right in Figure 1, which causes the cutter head assembly 43 to follow the fruit for a short distance in its path of travel. After the fruit has moved a short distance and the coring is complete, the cam 29 rotates to a position where it lifts the arm 41, bringing the cutting assembly out of contact with the fruit and shortly thereafter the cam 31 causes the arm 39 to move to the left in Figure 1, poising the cutter head assembly 43 over the next advancing fruit for a repetition of the cycle. As the cored fruit passes on down the conveyor belt, it passes over the roller 11 and falls onto the deflector 91 for further processing. The lugs on the belt assure positive synchronism of the cutter head and the advancing fruit receiving cups.

I claim:

A machine for coring fruit and the like comprising: a frame having mounted thereon an endless flexible belt, said felt having on the exterior surface thereof a series of cups for receiving the fruit to be cored, said receiving cups having a series of radial ribs adapted to prevent said fruit from turning within said cup; a source of power for continuously advancing said belt; a coring head positioned over said belt, said coring head having a shaft and a downwardly directed coring knife mounted on the end thereof; means operatively connected therewith for rotating said shaft at a high rate of speed said means being independent of said source of power for advancing the belt; a resilient flexible member mounted on the end of said coring head normally extending at least the full length of said knife, said resilient flexible member having a central aperture therein of a circumference in excess of that of the circle described by the said knife when said knife is rotated; a first lever for supporting said coring head; a second lever supporting said first lever at one end thereof, said second lever being pivotally secured to the said frame of said machine at one end thereof, said first mentioned lever having a downwardly depending cam follower and said second mentioned lever having a forwardly extending cam following secured thereto; a pair of elliptical cams mounted for rotary motion in operative association with said aforementioned cam followers, said elliptical cams being fixedly secured relative to one another; a source of rotary power for said cams; biasing means for maintaining contact between each of said cams and its respective cam follower during rotation of said cams whereby on application of rotary power to said cams, said cutting head mounted on the end of said first lever describes an elliptical path in timed synchronous relationship to the passage of each fruit-receiving cup whereby said head moves downwardly to contact the fruit located in said cup, thereafter follows said fruit for a short distance as the belt moves in a forwardly direction and thereafter said head raises and returns to contact the next fruit on said belt.

References Cited in the file of this patent

UNITED STATES PATENTS

| | | |
|---|---|---|
| 2,252,951 | Urschel et al. | Aug. 19, 1941 |
| 2,497,335 | Wissner | Feb. 14, 1950 |
| 2,512,921 | Daugherty | June 27, 1950 |
| 2,627,627 | McDougall | Feb. 10, 1953 |